United States Patent
Kiester et al.

(10) Patent No.: US 10,524,570 B2
(45) Date of Patent: Jan. 7, 2020

(54) CONSOLE DRAWER ASSEMBLY WITH DAMPENING MECHANISM

(71) Applicant: GM GLOBAL TECHNOLOGY OPERATIONS LLC, Detroit, MI (US)

(72) Inventors: Timothy A. Kiester, Orion, MI (US); Kenton L. West, Orion, MI (US); Jason H. Ross, Oxford, MI (US); Cameron T. Knight, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 93 days.

(21) Appl. No.: 15/944,014

(22) Filed: Apr. 3, 2018

(65) Prior Publication Data

US 2019/0298061 A1    Oct. 3, 2019

(51) Int. Cl.
*A47B 88/90* (2017.01)
*A47B 88/40* (2017.01)
*B60R 11/00* (2006.01)

(52) U.S. Cl.
CPC .............. *A47B 88/90* (2017.01); *A47B 88/40* (2017.01); *A47B 2210/0081* (2013.01); *A47B 2210/0091* (2013.01); *B60R 2011/0007* (2013.01); *B60R 2011/0084* (2013.01)

(58) Field of Classification Search
CPC . A47B 88/90; A47B 88/40; A47B 2210/0081; A47B 2210/0091; B60R 2011/0007; B60R 2011/0084
See application file for complete search history.

(56) References Cited

U.S. PATENT DOCUMENTS

| | | | | |
|---|---|---|---|---|
| 4,986,674 A | * | 1/1991 | Decker | B60N 3/08 384/10 |
| 5,002,074 A | * | 3/1991 | Kimisawa | A24F 19/08 131/231 |
| 5,992,559 A | * | 11/1999 | Ballard, Jr. | G01V 1/147 181/0.5 |
| 7,188,871 B2 | * | 3/2007 | Nemoto | E05B 83/30 292/170 |
| 2003/0209958 A1 | * | 11/2003 | Hwang | A47B 88/49 312/334.46 |
| 2005/0035262 A1 | * | 2/2005 | Seki | A47B 21/0314 248/441.1 |
| 2006/0197353 A1 | * | 9/2006 | Hanzel | B60R 11/00 296/37.12 |

(Continued)

*Primary Examiner* — Lori L Lyjak
(74) *Attorney, Agent, or Firm* — Lorenz & Kopf, LLP (57) ABSTRACT

A console drawer assembly is provided for a vehicle that includes, in one example: a housing having a recess formed therein. The housing is configured to fit between a driver seat and a passenger seat of the vehicle. The console drawer assembly also includes a drawer that is oriented to open into a floor area associated with back seats of the vehicle; the drawer is configured to slidably move within the recess, the drawer being movable between an open position and a closed position. In addition, the console drawer assembly includes a first spring dampening mechanism mounted to the housing, the first spring dampening mechanism extends into the recess, and is oriented to make contact with an exterior surface of the drawer in a first pre-identified stress region, and to absorb vertical stress therefrom.

17 Claims, 5 Drawing Sheets

(56) References Cited

U.S. PATENT DOCUMENTS

| | | | | |
|---|---|---|---|---|
| 2006/0220505 A1* | 10/2006 | Nakamura | ................ | G06F 1/16 312/223.2 |
| 2007/0262955 A1* | 11/2007 | Seki | ................ | G06F 1/18 345/156 |
| 2009/0261697 A1* | 10/2009 | Hill | ................ | D06F 39/02 312/333 |
| 2010/0019641 A1* | 1/2010 | Laible | ................ | F25D 25/025 312/404 |
| 2013/0222993 A1* | 8/2013 | Iizuka | ................ | G06F 1/1669 361/679.08 |
| 2013/0320693 A1* | 12/2013 | Schulz | ................ | B60N 3/102 296/37.14 |
| 2017/0303683 A1* | 10/2017 | Guivol | ................ | A47B 51/00 |
| 2017/0332509 A1* | 11/2017 | Miyatsu | ................ | G06F 1/18 |
| 2018/0297500 A1* | 10/2018 | Singh | ................ | B60N 3/105 |
| 2018/0319297 A1* | 11/2018 | Traiser | ................ | B60N 2/0715 |

* cited by examiner

CONSOLE DRAWER ASSEMBLY WITH DAMPENING MECHANISM

TECHNICAL FIELD

The technical field generally relates to vehicles and, more specifically, to console drawer assemblies for vehicles.

BACKGROUND

Many vehicles include console drawers for the driver and/or passengers to store items and place beverages. The console drawer assembly faces unique design requirements in that it often must provide a high level of utility while meeting strict dimension and weight requirements. In addition, due to its location, it may be subjected to repeated stress over time, further challenging the interplay of materials used and their dimensions. To address these challenges, improved console drawer assemblies may be desired.

Accordingly, it is desirable to provide improved console drawer assemblies and/or associated console drawer mechanisms for vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a console drawer assembly is provided.

In one exemplary embodiment, a console drawer assembly is provided. The console drawer assembly includes a housing having a recess formed therein, a drawer, and a first spring dampening mechanism. The drawer is configured to slidably move within the recess, being movable between an open position and a closed position. The first spring dampening mechanism is mounted to the housing, and extends into the recess, oriented to make contact with an exterior surface of the drawer in a first pre-identified stress region, and to absorb vertical stress therefrom.

Also, in one embodiment, the housing is configured to fit in a vehicle, between a driver seat and a passenger seat of the vehicle, and the drawer is oriented to open into a floor area associated with back seats of the vehicle.

Also in one embodiment, a second spring dampening mechanism is mounted to the housing. The second spring dampening mechanism extending into the recess, and oriented to make contact with the exterior surface of the drawer in a second pre-identified stress region, and to absorb vertical stress therefrom.

Also in one embodiment, a substantially hollow, telescoping rail is configured to provide stability to the drawer as it is moved from the open position to the closed position, the telescoping rail having (i) an extended position, during which the drawer is open, and (ii) a collapsed position and stowed within the recess when the drawer is closed.

Also in one embodiment, each spring dampening mechanism includes a respective dampener cap, spring, and dampener housing, each being coaxial.

Also in one embodiment, the dampener cap is made of an acetal, and the spring is made of a spring steel.

Also in one embodiment, the dampener housing has a connection region having two or more snap legs configured to fit flush against a stabilizing surface of the housing.

In another exemplary embodiment, a console drawer assembly for a vehicle is provided. The console drawer assembly includes a housing, a drawer, a first spring dampening mechanism, and a second spring dampening mechanism. The housing is integrated with a center console of the vehicle, and has a recess formed therein. The drawer has an item storage area, and is configured to slidably move within the recess, between a closed position, in which it is substantially enclosed within the recess, and an open position, in which the item storage area is at least partially accessible to passengers in a back seat of the vehicle. The first spring dampening mechanism is mounted to the housing, extending upward into the recess, oriented to make contact with an exterior surface of the drawer in a first pre-identified stress region, and to absorb vertical stress therefrom. The second spring dampening mechanism is mounted to the housing, extending downward into the recess, and oriented to make contact with the exterior surface of the drawer in a second pre-identified stress region, and to absorb vertical stress therefrom.

Also in one embodiment, the item storage area includes a feature configured to provide a cup holding function, defined by receiving and supporting a beverage, while the drawer is in the open position.

Also in one embodiment, the drawer further has an intermediate position, in which access to the cup holding function is allowed, but access to a remainder of the item storage area is prevented.

Also in one embodiment, the drawer has a handle, and the drawer moves position responsive to user manipulation of the handle.

Also in one embodiment, the drawer has a footer, configured to make contact with a floor area associated with the back seat.

Also in one embodiment, a substantially hollow, telescoping rail is included. The telescoping rail is configured to provide stability to the drawer as it is moved from the open position to the closed position. The telescoping rail (i) having an extended position when the drawer is open, and (ii) stowed within the recess in a collapsed position, when the drawer is closed.

Also in one embodiment, each spring dampening mechanism includes a respective dampener cap, spring, and dampener housing, each being coaxial.

Also in one embodiment, the dampener cap is made of an acetal, and the spring is made of a spring steel.

In another exemplary embodiment, a vehicle is provided. The vehicles include a driver seat; a passenger seat; a back seat; a center console, disposed between the driver seat and the passenger seat, and having integrated therein a console drawer assembly. The console drawer assembly includes a housing, a drawer, and a first spring dampening mechanism. The housing has a recess formed therein. The drawer has an item storage area, and is configured to slidably move within the recess, between a closed position, in which it is substantially enclosed within the recess, and an open position, in which the item storage area is at least partially accessible to passengers in the back seat of the vehicle. The first spring dampening mechanism is mounted to the housing, extending upward into the recess, oriented to make contact with an exterior surface of the drawer in a first pre-identified stress region, and to absorb vertical stress therefrom.

Also in one embodiment, the item storage area includes a feature configured to provide a cup holding function, defined by receiving and supporting a beverage, while the drawer is in the open position.

Also in one embodiment, the drawer further has an intermediate position, in which access to the cup holding function is allowed, but access to a remainder of the item storage area is prevented.

Also in one embodiment, a second spring dampening mechanism is mounted to the housing, the second spring dampening mechanism extending downward into the recess, and oriented to make contact with the exterior surface of the drawer in a second pre-identified stress region, and to absorb vertical stress therefrom.

Also in one embodiment, a substantially hollow, telescoping rail is included. The telescoping rail is configured to provide stability to the drawer as it is moved from the open position to the closed position, the telescoping rail (i) having an extended position when the drawer is open, and (ii) stowed within the recess in a collapsed position, when the drawer is closed.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
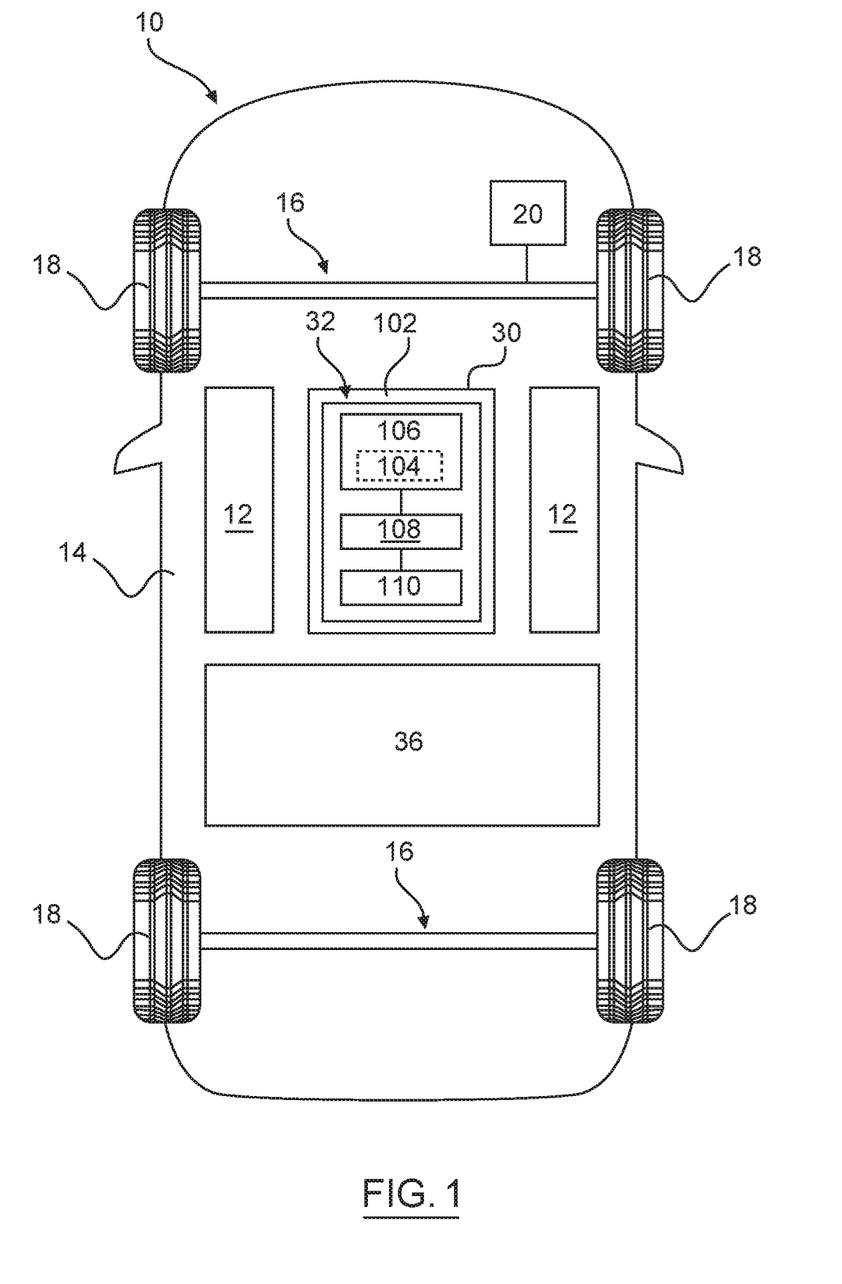
FIG. 1 is a functional block diagram of a vehicle that includes a console drawer assembly that includes a housing and a drawer that is movable between an open position and a closed position, in accordance with an exemplary embodiment.

FIG. 1 illustrates a vehicle 10, according to an exemplary embodiment. As described in greater detail further below, the vehicle 10 includes a console drawer assembly 32 for holding beverages storing items for one or more occupants (e.g., drivers and/or passengers) of the vehicle 10, for example as described in greater detail further below in connection with FIG. 1 as well as FIGS. 2-6. As used throughout this Application, the term beverage refers to beverages that include containers or vessels, as well as the containers or vessels themselves (regardless of whether they are filled with a beverage).

The vehicle 10 preferably comprises a land-based automobile. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a motorcycle or other vehicle, or other system.

The vehicle 10 includes a body 14 that is arranged on a chassis 16. The body 14 substantially encloses other components of the vehicle 10. The body 14 and the chassis 16 may jointly form a frame. The vehicle 10 also includes a plurality of wheels 18. The wheels 18 are each rotationally coupled to the chassis 16 near a respective corner of the body 14 to facilitate movement of the vehicle 10. In one embodiment, the vehicle 10 includes four wheels 18, although this may vary in other embodiments (for example for trucks and certain other vehicles).

Also as depicted in FIG. 1, in various embodiments, the vehicle 10 includes occupant seating that includes two front seats 12 (e.g., a front driver seat and a front passenger seat, in one embodiment) and one or more rear seats 36. Also in the depicted embodiments, the vehicle 10 also includes a center console 30 that is disposed between the front seats 12 (e.g., between the front driver seat and the front passenger seat, in one embodiment).

A drive system 20 is mounted on the chassis 16, and drives the wheels 18. The drive system 20 preferably comprises a propulsion system. In certain exemplary embodiments, the drive system 20 comprises an internal combustion engine and/or an electric motor/generator, coupled with a transmission thereof. In certain embodiments, the drive system 20 may vary, and/or two or more drive systems 20 may be used. By way of example, the vehicle 10 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

The console drawer assembly 32, as mentioned above, is configured to receive and store items for one or more occupants of the vehicle 10. In the depicted embodiment, the console drawer assembly 32 is disposed within the center console 30, and oriented to be within reach of passengers in the rear seats 36. However, in other embodiments, the console drawer assembly 32 may be disposed within one or more other regions of the vehicle 10, or in a non-vehicle platform.

Figure 2:
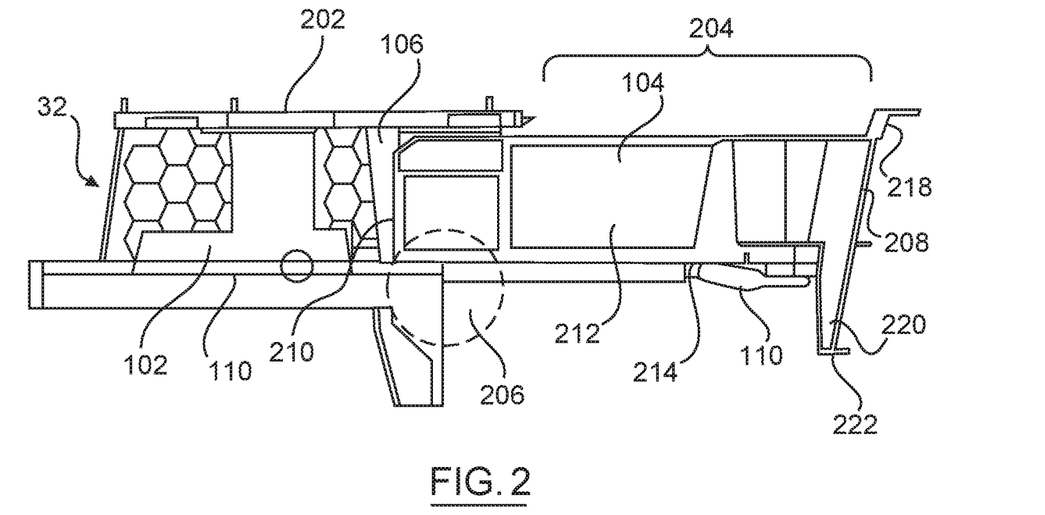
FIG. 2 is a schematic illustration of a side view the console drawer assembly of FIG. 1, depicted in an open position, in accordance with an exemplary embodiment.
Figure 3:
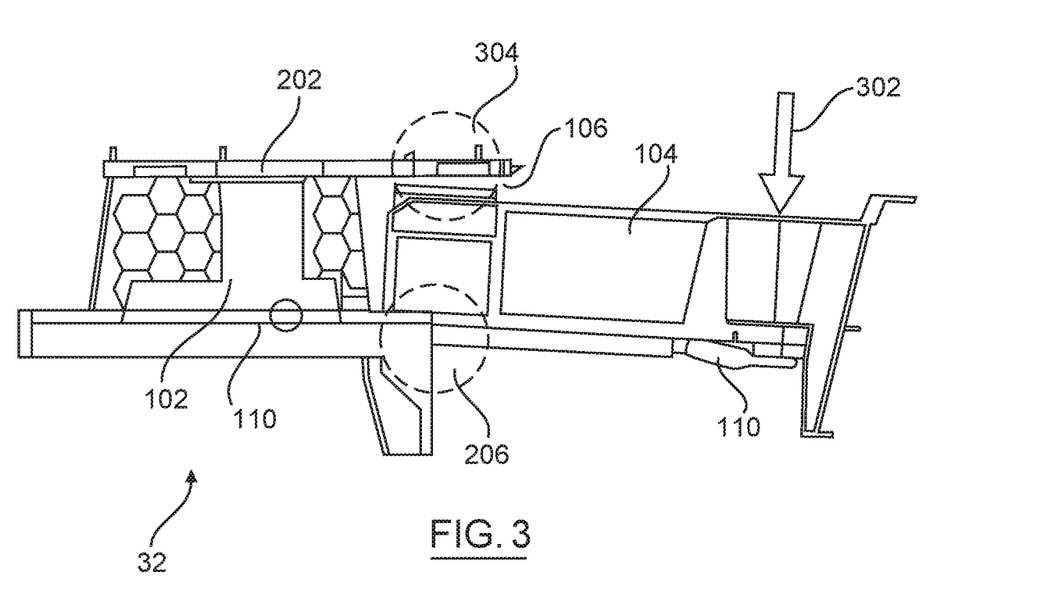
FIG. 3 is a schematic illustration of the console drawer assembly of FIG. 2, depicted in an open position, and subjected to a downward force, in accordance with an exemplary embodiment.

As depicted in FIGS. 1-3, in one embodiment, the console drawer assembly 32 comprises a housing 102, a drawer 104, and a dampening mechanism 108. The housing 102 has a recess 106 formed therein. The recess 106 has an interior surface defined by a housing upper interior surface, a housing lower interior surface, a housing left sidewall and a housing right sidewall. In various embodiments, the upper interior surface of the housing 102 may be further defined by a ceiling plate 202.

The drawer 104 is configured to slidably move within the recess 106. The drawer 104 has therein a storage area 204 that is defined by a front wall 208, a back wall 210, two sides (left side 212, and right side obscured from view), and a bottom 214. More specifically, an interior surface of the walls (208, 210), sides (212, obscured), and bottom 214 may define the storage area 204. In some embodiments, the walls (208, 210), sides (212, obscured), and bottom are formed of one continuous, unitary surface; in other embodiments, the walls (208, 210), sides (212, unnamed), and bottom are separately formed and connected, with or without visible seams. In various embodiments, the drawer 104 is oriented to be within arm's reach of passengers in the rear seats 36 of the vehicle 10.

The drawer 104 moves between (i) a closed position, in which it is substantially enclosed within the recess 106, and (ii) an open position. In the open position, the storage area 204 is at least partially disposed outside the housing 102, in order to be within reach of the vehicle occupant. In various embodiments, a feature of the storage area 204 is configured to provide a cup-holding function, i.e., to receive and support a beverage, while the drawer 104 is in the open position. When in the closed position, the drawer 104 is stowed in the recess 106 of the housing 102, thereby preventing access to the storage area 204 and removing the cup holding function. In embodiments having a cup holder feature, the drawer 104 may have an additional intermediate position, in which access to the cup holding function is allowed, but access to a remainder of the storage area is prevented. As may be appreciated, in both the open and closed position, the drawer 104 is configured to provide item storage by at least partially surrounding the items.

The drawer 104 may have a handle 218, and the drawer may be configured to be moved between positions responsive to user manipulation of the handle 218. In other embodiments, the drawer may be configured to be moved between positions responsive to user manipulation of an electrical or mechanical an actuation system (not shown). In various embodiments, the drawer 104 includes a footer 220, which is configured to be a support extension that extends downward from the drawer 104. The footer 220 is configured to make contact (at contact surface 222) with a surface such as a floor area associated with the rear seats 36.

When the drawer 104 is extended, or in the open position, weight from items stored in the storage area 204 may cause undesirable stress on the drawer 104. Also, as the drawer moves laterally, (i.e., for all drawer 104 positions: the open position, the closed position, and all intermediate positions associated therewith), weight from items stored in the storage area 204 may cause undesirable stress on the drawer 104. The mechanics of the drawer response to a variety of stresses can be modeled, and, responsive thereto, one or pre-identified stress regions, or hot spots where the stress is anticipated to be the most extreme, can be located. In the illustrated example, stress region 206 of the console drawer assembly 32 is generally defined as an area of potential item storage stress between (i) the bottom 214 of the drawer 104, at the back wall 210 of the drawer 104, and (i) the recess 106, specifically, at a lower interior surface of the housing 102. As used herein, "bottom" and "lower" are associated with the bottom of the page when viewing the figures (or the opposite direction of the arrow 450 in FIG. 4).

In addition to item storage stress, occasionally, as shown in FIG. 3, an extended drawer 104 may receive undesirable external forces 302 in the downward direction. These external forces 302 may represent unintentional contact, such as a person stepping on the extended drawer 104, a heavy item sliding off of a rear seat 36 onto the drawer 104, or the like. The external forces 302 can also be modeled, resulting in modifying the dimensions or anticipated stress magnitude of the previously identified stress region 206, and/or identifying additional stress regions. In the illustrated example, stress region 304 is added in anticipation of the stress from external forces 302. Stress region 304 is defined as an area in which the back wall 210 and portions of the sides 212 of the extended drawer 104 contacts the upper interior surface of the housing 102 (in various embodiments, this may be an inner surface of the ceiling plate 202).

A dampening mechanism 108 is specifically configured to mitigate the anticipated stress in the stress region(s). A first damping mechanism 108 is shown mounted to the housing 102 in the stress region 206. A connection region 452 of the dampening mechanism 108 makes contact with the housing 102. The damping mechanism 108 extends from the connection region 452 into the recess 106 of the housing 102. Dampening mechanism 108 is oriented to absorb the stress from vertical movement of the drawer 104, and to provide damping functionality as the drawer moves laterally. As used herein, the "dampening functionality" provided by the dampening mechanism 108 refers to absorbing the above described vertical stress. In various embodiments, the dampening functionality is specifically provided by a compression component. In various embodiments, one or more dampening mechanisms 108 may be mounted to the housing 102 at the bottom interior surface and extend upward into the recess 106, oriented to make contact with a bottom exterior surface of the drawer 104. Also, in various embodiments, one or more dampening mechanisms 108 may be mounted to the housing 102 at the upper interior surface and extend downward into the recess 106, and oriented to make contact with a top surface of the back wall 210 and/or a top surface of a side of the drawer 104.

Figure 4:
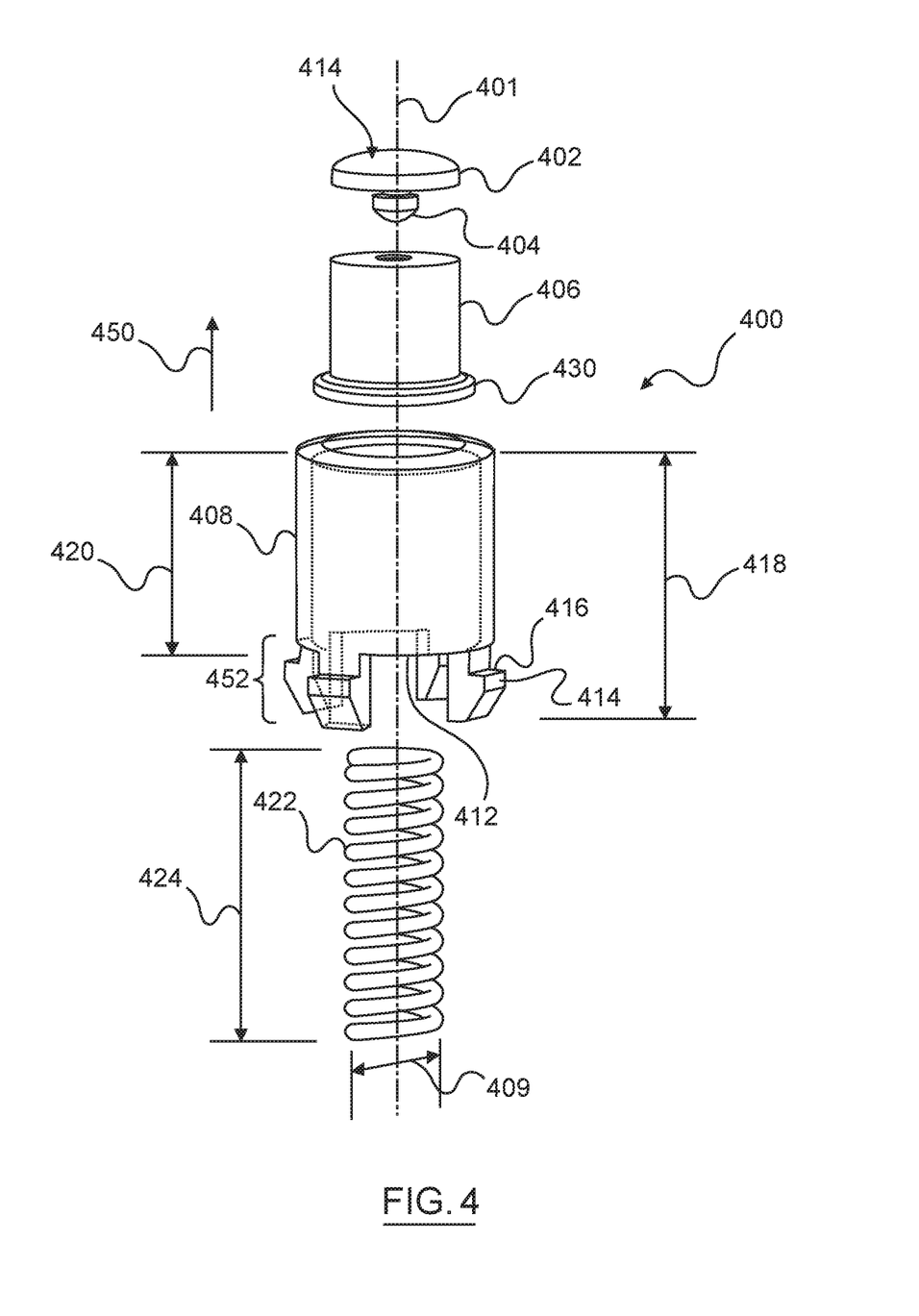
FIGS. 4 and 5 are schematic illustrations of a dampening mechanism of the console drawer assembly of FIGS. 1-3, in accordance with an exemplary embodiment.
Figure 5:
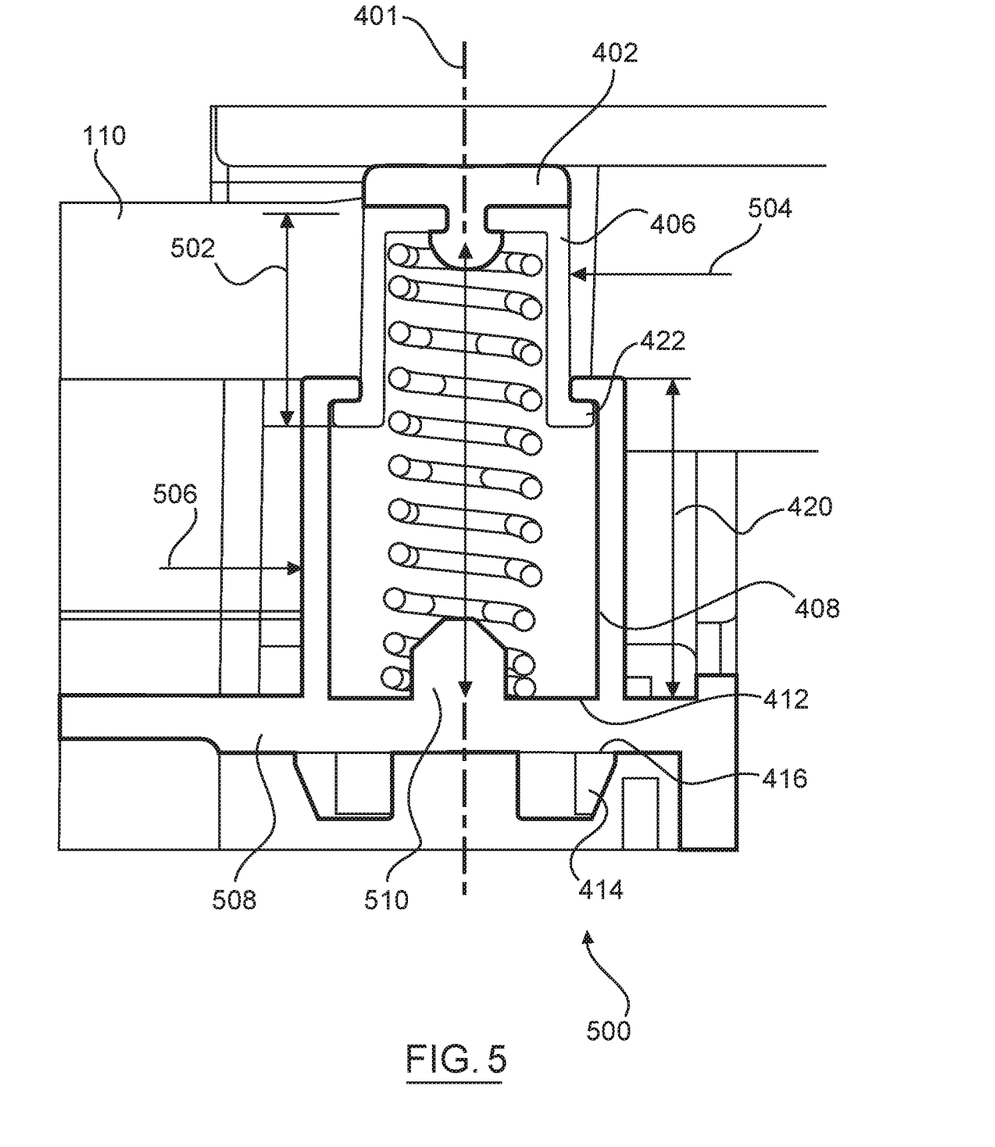

Turning now to FIGS. 4-5, an example spring dampening mechanism 400 is described. FIGS. 4-5 include various components that cooperate to perform the dampening function. In FIG. 4, the components of the spring dampening mechanism 400 are shown separately, and in FIG. 5, the components are shown assembled, and installed into the console drawer assembly. Components of the spring dampening mechanism 400 are understood to have a circular cross section, having a diameter measured perpendicular to a central axis 401. In an embodiment, the dampening mechanism 400 comprises a dampener cap 406, a dampener housing 408, and a compression spring 422.

The dampener cap 406 is placed inside a dampener housing 408. A spring 409, having a length 424, and a diameter 409, fits coaxially inside the dampener housing 408. The dampener cap 406 is pushed to the top of the dampener housing 408 by the spring 422 (the top or "upward" is associated with the top of the page, and is shown by the arrow 450). When installed, under pressure from the spring 409, the dampener cap 406 rests, secured via a rim 430 that encircles the dampener cap 406 and is sized to fit inside an opening in the top portion of the dampener housing 408. The dampener cap 406 protrudes from the opening in the dampener housing 408 under upward force of the spring 422 where it absorbs force. In an embodiment, a portion of the spring dampening mechanism 400 making contact with the exterior surface of the drawer 104 comprises a cap bumper 402 fitted into a dampener cap 406, via a snap 404. Downward force received at the dampener cap 406 causes the dampener cap 406 to travel downward (referencing FIGS. 4 and 5, "down" being the bottom of the page), and within the dampener housing 408, causing the spring 422 to compress, thereby absorbing at least some of the received force. The dampener cap 406 has a cap height 502 and a cap diameter 504. The dampener housing 408 has a housing height 420 measured from a contact surface 412.

As mentioned, the dampener housing 408 makes contact with the housing at the connection region 452. The dampener housing 408 has a second height 418 when connection region 452 is included. In an embodiment, the connection region 452 comprises two or more snap legs 414, configured to fit through a hole in a stabilizing surface of the housing 102, such as a connecting platform 508. The snap legs 414 each having an upper surface 416 Upper surface 416 of snap legs 414 are configured to fit flush against an external side of the connecting platform 508 when installed. When assembled, the entire spring dampening mechanism 400 may secure on the connecting platform 508 by also fitting over a projection 510. Projection 510 being configured with a thickness and diameter to fit inside the turns of the spring 422 without interfering with the functionality of the spring 422. In various embodiments, the dampener cap 406, spring 422, and dampener housing 408, are each coaxial, and their axis, central axis 401, is substantially perpendicular to a plane along which drawer 104 movement occurs. As may be appreciated, to address vertical stress received in stress region 304 (in an upward direction), a second dampening mechanism 108 is installed in the upper interior of the housing 106, and FIGS. 4 and 5 can be rotated upside down to determine respective component orientation, for the second dampening mechanism 108.

In various embodiments, the cap bumper 402 is made of a thermoplastic elastomer. In various embodiments, the dampener cap 406 is made of an acetal. In various embodiments, the dampener housing 408 may be made of a high density thermoplastic (for example, a polycarbonate acrylonitrile butadiene styrene (PC-ABS)). In various embodiments, the compression spring 422 may be made of spring steel that meets an industry standard, such as the American Section of the International Association of Testing Materials (ASTM) A228. As used herein, substantially means plus or minus five percent. In various embodiments, the compression spring 422 is substantially 27.75 millimeters (mm) long/tall, the diameter of the dampener cap is 13 mm, the diameter of the dampener housing is 20 mm. In various embodiments, the dampener housing is 20 mm tall and the dampener cap is 13.5 mm tall.

Figure 6:
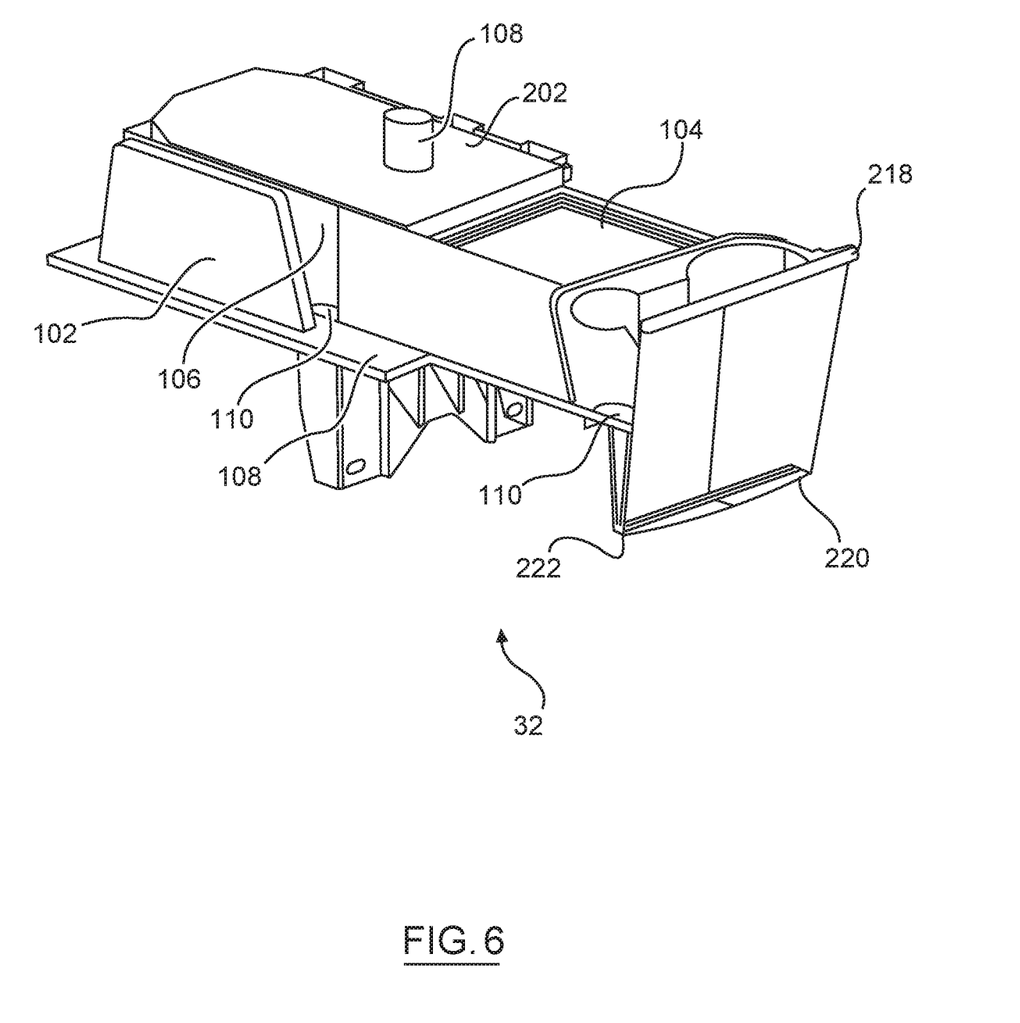
FIG. 6 is a three dimensional perspective view of the console drawer assembly of FIGS. 1 and 2, showing dampening mechanism placement, in accordance with an exemplary embodiment.

Various design methods, such as grooves and rails, may be used to stabilize and enable the drawer 104 to slide in and out of the recess 106. In the depicted embodiment, a substantially hollow, tubular, telescoping rail 110 provides stability to the drawer 104 as it moves between positions. The telescoping rail (i) has an extended position when the drawer is open, and (ii) is stowed within the recess in a collapsed position, when the drawer is closed. In embodiments employing the one or more telescoping rails 110, the telescoping rails 110 may cooperate with one or more dampening mechanisms 108 in performing the dampening functionality for the drawer 104. This cooperation may be fostered by selection of materials and dimensions of the telescoping rails 110, as well as the placement of the one or more damping mechanisms 108 with respect to the one or more telescoping rails 110. This cooperation has the technical effect of minimizing material weight of the telescoping rails 110 while still meeting functional requirements of the drawer 104. In FIG. 5, the dampener cap 406 is shown in direct contact with the telescoping rail 110. In various embodiments, when in the closed position, the drawer 104, the one or more dampening mechanisms 108, and the one or more telescoping rails 110 are stowed within the recess 106 within the housing 102. For reference, the perspective view of FIG. 6 provides a view of the console drawer assembly 32 having a dampening mechanism 108 in stress region 304 and a dampening mechanism in stress region 206. Another dampening mechanism 108 is assumed present, but obscured from view, on the far side of the drawer 104. These features are described further below.

Accordingly, the systems, vehicles, and mechanisms described herein provide for potentially improved console drawer assembly 32. The disposed console drawer assembly 32 mechanisms and systems provide for potentially improved console drawer that is more resilient to external forces 302, providing improved performance and/or reduced manufacturing and/or maintenance costs.

It will be appreciated that the console drawer assembly mechanisms, systems, and vehicles may vary from those depicted in the Figures and described herein. For example, the vehicle 10, the console drawer assembly 32, and/or various components thereof may vary from those depicted in FIGS. 2-6 and described in connection therewith, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A console drawer assembly, comprising:
a housing having a recess formed therein;
a drawer that is configured to slidably move within the recess, the drawer being movable between an open position and a closed position;
a first spring dampening mechanism mounted to the housing, the first spring dampening mechanism extending into the recess, oriented to make contact with an exterior surface of the drawer in a first pre-identified stress region, and to absorb vertical stress therefrom; and
a second spring dampening mechanism mounted to the housing, the second spring dampening mechanism extending into the recess, and oriented to make contact with the exterior surface of the drawer in a second pre-identified stress region, and to absorb vertical stress therefrom.

2. The console drawer assembly of claim 1, wherein the housing is configured to fit in a vehicle, between a driver seat and a passenger seat of the vehicle, and the drawer is oriented to open into a floor area associated with back seats of the vehicle.

3. The console drawer assembly of claim 2, further comprising a substantially hollow, telescoping rail configured to provide stability to the drawer as the drawer is moved from the open position to the closed position, the telescoping rail having (i) an extended position, during which the drawer is open, and (ii) a collapsed position and stowed within the recess when the drawer is closed.

4. The console drawer assembly of claim 3, wherein each spring dampening mechanism comprises a respective dampener cap, spring, and dampener housing, each being coaxial.

5. The console drawer assembly of claim 4, wherein the dampener cap is made of an acetal, and the spring is made of a spring steel.

6. The console drawer assembly of claim 5, wherein the dampener housing comprises a connection region having two or more snap legs configured to fit flush against a stabilizing surface of the housing.

7. A console drawer assembly for a vehicle, comprising:
a housing integrated with a center console of the vehicle, the housing having a recess formed therein;
a drawer having an item storage area, the drawer configured to slidably move within the recess, between a closed position, in which the drawer is substantially enclosed within the recess, and an open position, in which the item storage area is at least partially accessible to passengers in a back seat of the vehicle;
a first spring dampening mechanism mounted to the housing, the first spring dampening mechanism extending upward into the recess, oriented to make contact with an exterior surface of the drawer in a first pre-identified stress region, and to absorb vertical stress therefrom; and
a second spring dampening mechanism mounted to the housing, the second spring dampening mechanism extending downward into the recess, and oriented to make contact with the exterior surface of the drawer in a second pre-identified stress region, and to absorb vertical stress therefrom.

8. The console drawer assembly of claim 7, wherein the item storage area comprises a feature configured to provide a cup holding function, defined by receiving and supporting a beverage, while the drawer is in the open position.

9. The console drawer assembly of claim 8, wherein the drawer further comprises a handle, and the drawer moves position responsive to user manipulation of the handle.

10. The console drawer assembly of claim 9, wherein the drawer further comprises a footer, configured to make contact with a floor area associated with the back seat.

11. The console drawer assembly of claim 8, further comprising a substantially hollow, telescoping rail configured to provide stability to the drawer as the drawer is moved from the open position to the closed position, the telescoping rail (i) having an extended position when the drawer is open, and (ii) stowed within the recess in a collapsed position, when the drawer is closed.

12. The console drawer assembly of claim 8, wherein each spring dampening mechanism comprises a respective dampener cap, spring, and dampener housing, each being coaxial.

13. The console drawer assembly of claim 8, wherein the dampener cap is made of an acetal, and the spring is made of a spring steel.

14. A vehicle comprising:
a driver seat;
a passenger seat;
a back seat;
a center console disposed between the driver seat and the passenger seat, the center console comprising a console drawer assembly, the console drawer assembly comprising:
a housing integrated housing having a recess formed therein;
a drawer having an item storage area, the drawer configured to slidably move within the recess, the drawer moveable between a closed position, in which the drawer is substantially enclosed within the recess, and an open position, in which the item storage area is at least partially accessible to passengers in the back seat of the vehicle; and
a first spring dampening mechanism mounted to the housing, the first spring dampening mechanism extending upward into the recess, oriented to make contact with an exterior surface of the drawer in a first pre-identified stress region, and to absorb vertical stress therefrom.

15. The vehicle of claim 14, wherein the item storage area comprises a feature configured to provide a cup holding function, defined by receiving and supporting a beverage, while the drawer is in the open position.

16. The vehicle of claim 15, further comprising:
a second spring dampening mechanism mounted to the housing, the second spring dampening mechanism extending downward into the recess, and oriented to make contact with the exterior surface of the drawer in a second pre-identified stress region, and to absorb vertical stress therefrom.

17. The vehicle of claim 16, further comprising:
a substantially hollow, telescoping rail configured to provide stability to the drawer as the drawer is moved from the open position to the closed position, the telescoping rail (i) having an extended position when the drawer is open, and (ii) stowed within the recess in a collapsed position, when the drawer is closed.

* * * * *